US005183360A

United States Patent [19]

Freeman

[11] Patent Number: 5,183,360

[45] Date of Patent: * Feb. 2, 1993

[54] LIFTING EYEBOLT ASSEMBLY

[76] Inventor: Lewis G. Freeman, 1509 Pontiac Dr., Kokomo, Ind. 46901

[ * ] Notice: The portion of the term of this patent subsequent to Oct. 8, 2008 has been disclaimed.

[21] Appl. No.: 744,255

[22] Filed: Aug. 13, 1991

Related U.S. Application Data

[63] Continuation-in-part of Ser. No. 569,922, Aug. 20, 1990, Pat. No. 5,054,982.

[51] Int. Cl.[5] ........................ F16B 23/00; F16B 45/00; B66C 1/34

[52] U.S. Cl. .................................... 411/400; 411/397; 411/384; 294/82.1

[58] Field of Search ............... 411/383, 384, 344, 389, 411/396, 397, 400, 401, 485; 24/598.9; 248/317, 324, 327, 339, 341; 294/82.1, 89, 90, 91

[56] References Cited

U.S. PATENT DOCUMENTS

| | | | |
|---|---|---|---|
| 1,642,958 | 9/1927 | Joyner . | |
| 1,867,574 | 7/1932 | Leman . | |
| 2,519,460 | 8/1950 | Hansen | 287/91 |
| 2,651,533 | 9/1953 | Miller | 287/91 |
| 2,672,230 | 3/1954 | Jetzke | 198/177 |
| 2,812,971 | 11/1957 | Teutsch | 294/78 |
| 3,297,293 | 1/1967 | Andrews et al. | 248/361 |
| 3,492,033 | 1/1970 | Mueller | 287/91 |
| 3,534,650 | 10/1970 | Kubokawa | 85/3 |
| 3,628,820 | 12/1971 | Blatt | 294/82 R |
| 3,905,633 | 9/1975 | Larson | 294/82 R |
| 4,431,352 | 2/1984 | Andrews | 410/101 |
| 4,570,987 | 2/1986 | Wong et al. | 294/1.1 |
| 4,615,554 | 10/1986 | Schilla et al. | 411/400 X |
| 4,641,986 | 2/1987 | Tsui et al. | 403/164 |
| 4,699,410 | 10/1987 | Seidel | 294/1.1 |
| 4,705,422 | 11/1987 | Tsui et al. | 403/60 |

OTHER PUBLICATIONS

A. S. Geisler Co. of Detroit, Mich., product brochure, 3 pages.

Eyebolts and Related Products brochure, 6 pages.

*Primary Examiner*—Neill R. Wilson

*Attorney, Agent, or Firm*—Woodard, Emhardt, Naughton, Moriarty & McNett

[57] ABSTRACT

A lifting eyebolt assembly for engagement between a workpiece to be lifted and a lifting device includes a load-bearing ring that is connected to the workpiece by a threaded fastener. The load-bearing ring includes a base portion having a threaded central cavity. The fastener includes a threaded head portion for engaging the threaded cavity of the base portion of the load-bearing ring. The fastener also includes a threaded shaft portion for engaging a threaded bore within the workpiece. In one aspect of the invention, an access hole is provided between the eye portion of the load-bearing ring and the central cavity. In addition, the head portion of the fastener includes a recess disposed beneath the access hole to permit engagement with an allen wrench passing through the access hole. In one embodiment of the invention, the workpiece includes a recess around the threaded bore within which the head portion of the fastener is received when connected to the load-bearing ring. In another embodiment, the workpiece surface remains smooth, and a washer is disposed between the head portion of the fastener and the surface of the workpiece. In both embodiments, the load-bearing ring is threaded onto the threaded portion of the fastener until the base portion of the ring contacts either the workpiece or the washer, after which the load-bearing ring is backed off a partial or complete turn.

17 Claims, 6 Drawing Sheets

LIFTING EYEBOLT ASSEMBLY

CROSS-REFERENCE TO RELATED APPLICATION

This application is a continuation-in-part application to my co-pending patent application Ser. N. 569,922 filed Aug. 20, 1990 now U.S. Pat. No. 5,054,982.

BACKGROUND OF THE INVENTION

This invention relates generally to a lifting eyebolt for connection between a workpiece to be lifted and a lifting device, such as a hoist A lifting device is normally attached to an eyebolt, which in turn is normally secured to the workpiece or load to be lifted. Because workpieces come in various shapes and usually leave little or no choice as to where a lifting eyebolt can be attached, the eyebolts are regularly subjected to forces at odd angles that often result in large bending and shear stresses. These forces often mandate the use of an oversized eyebolt. However, the use of an oversize bolt may require drilling and tapping a new, larger hole in the workpiece to be lifted.

A lifting eyebolt is most efficient when the force exerted on the eyebolt lies in the plane defined by the eye. This effectiveness deteriorates rapidly as force is applied outside the plane of the eye. Another problem of typical eyebolts is their tendency to bend at the interface to the workpiece. This bending can stress the eyebolt until it shears at the attachment face of the workpiece.

An improvement over existing eyebolts is desirable which allows the eyebolt to be attached securely to a workpiece in a way that ensures that the force from the lifting device can always be made to lie in the plane of the eye. This flexibility will allow the efficient use of properly sized eyebolts and will also result in a prolonged working life for each individual eyebolt. It is also desirable to provide an improved eyebolt assembly that prevents or restricts bending of the eyebolt at the interface to the workpiece.

SUMMARY OF THE INVENTION

One embodiment of the lifting eyebolt assembly comprises a load-bearing ring engaged by way of a threaded fastener to the workpiece. The base portion of the load-bearing ring includes a threaded cavity to engage an outer threaded surface of head of the fastener. In one aspect of this embodiment, the workpiece includes a recess within which the had of the fastener sits. The base portion can be tightened against the workpiece and then backed off slightly so that the plane defined by the eye of the load-bearing ring is in any desired orientation around the axis of the fastener. In another feature of the invention, the load-bearing ring includes means to access the fastener after the fastener has been received into the base portion of the load-bearing ring. In one embodiment, this access means includes an access hole from the eye to the threaded cavity of the base portion.

In another embodiment, a washer is interposed between the workpiece and the load-bearing ring, with the fastener extending therethrough. The base portion can be tightened against the washer and then backed off slightly, as in the previous embodiment. An object of this invention is to provide a simple, economical and relatively lightweight alternative to conventional lifting eyebolts, which can be quickly adapted to a variety of load lifting situations. The new design allows the eyebolt assembly to be quickly and properly aligned with the line of pull from the lifting device in a way that best utilizes the strength of the eyebolt. A further object is to provide an eyebolt assembly that permits different diameters between the workpiece threaded bore and the eyebolt, thereby permitting use of a larger eyebolt with a standard fastener.

Another object is to decrease the risk of deforming of shearing the eyebolt at the interface to the workpiece. This invention reduces many unnecessary stresses that otherwise plague conventional eyebolts. A further object is to eliminate the need to drill and tap a larger hole in the workpiece to accommodate a large eyebolt. Other objects and benefits of the invention will become apparent from the following description and accompanying figures.

DESCRIPTION OF THE PREFERRED EMBODIMENT

Figure 1:
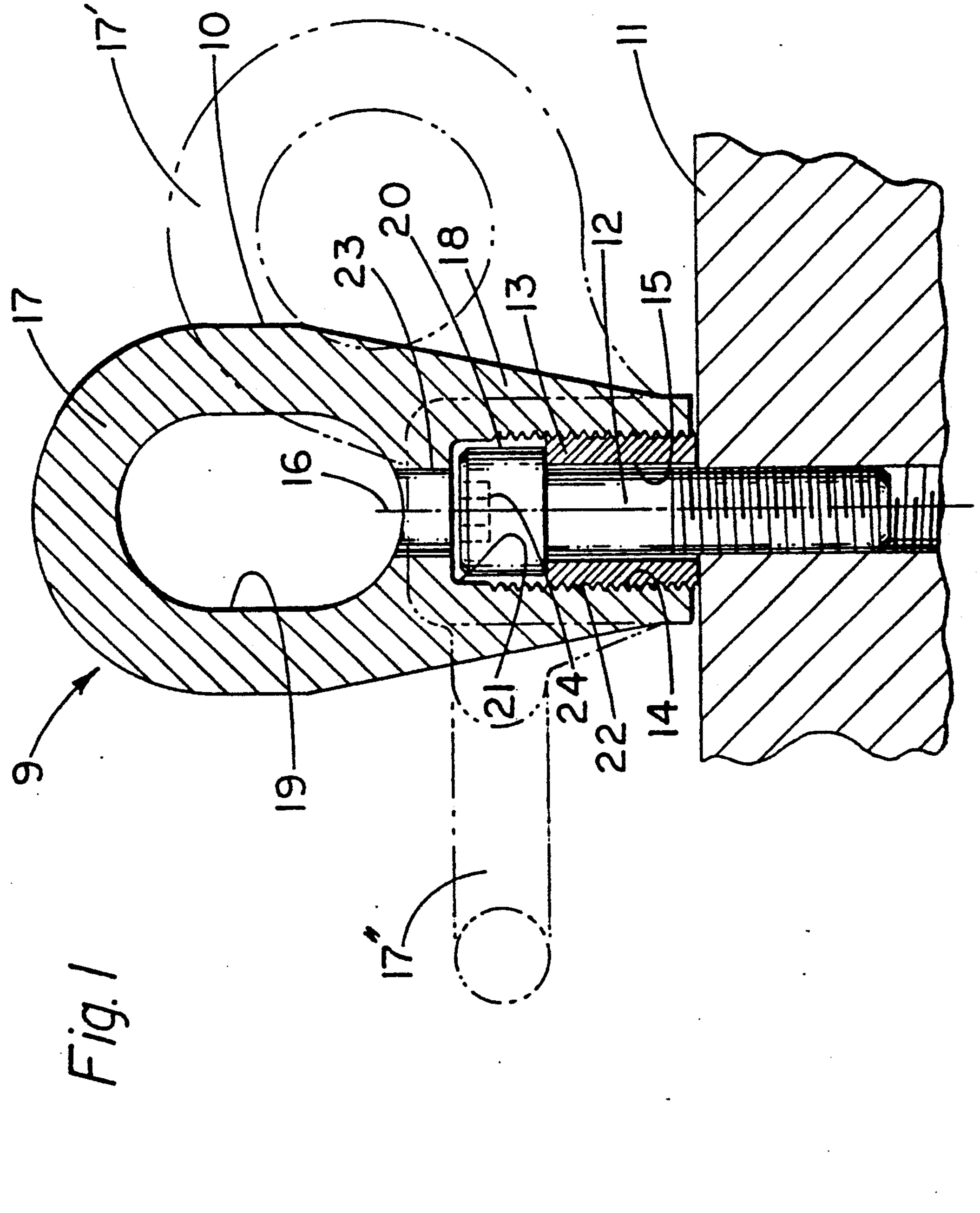
FIG. 1 is a front cross-sectional view of a lifting eyebolt assembly of this invention attached to a workpiece, with two offset eye embodiments shown by phantom lines.
Figure 1A:
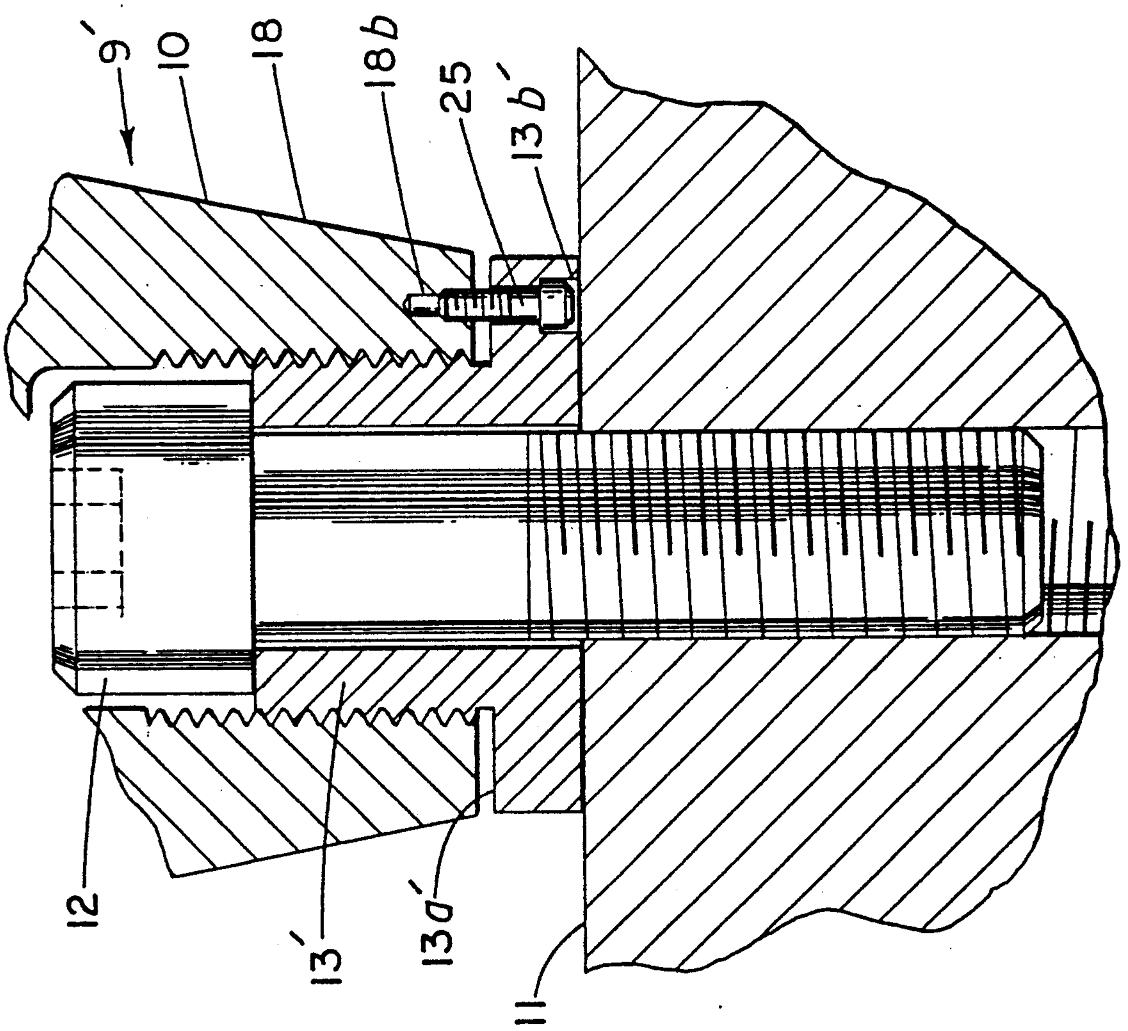
FIG. 1A is fragmentary front cross-sectional front view of a lifting eyebolt assembly as viewed in FIG. 1 with the substitution of a flanged collar.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

One embodiment of the present invention is illustrated in FIG. 1. A lifting eyebolt assembly 9 includes a load-bearing ring 10 which is removably attached to a workpiece 11 by a fastener 12. The fastener 12, in one specific embodiment, is an allen head screw, although some other conventional fastener may be used. A collar 13 is provided having a threaded outer surface 14 and a longitudinal bore 15 therethrough. The bore 15 is sized to receive fastener 12 therethrough in a way that allows the collar to freely rotate about axis 16, at least until the fastener is fully tightened to the workpiece.

The load-bearing ring 10 includes an eye portion 17 and a base portion 18. The eye portion 17 has an opening 19 to engage the shackle or hook (not shown) of a lifting device. Two offset eye embodiments are shown in phantom in FIG. 1. In one embodiment, the eye portion 17′ lies in the same plane as eye 17 but is oriented at an angle to the axis 16 of the fastener 12. In the other embodiment, the eye portion 17″ is oriented with its plane at right angles to the plane of eye 17 and generally parallel to the face of the workpiece.

The base portion 18 defines a cavity 21 large enough to accommodate the collar 13 and the head 20 of fastener 12. The cavity 21 is threaded on its inner surface 22 in order to engage the threaded outer surface 14 of collar 13. In one embodiment, the load-bearing ring 10, which is preferably made from forged steel to ensure proper strength, includes an access hole 23 between eye opening 19 and cavity 21. The access hole 23 provides passage for an allen wrench or other tool (not shown) to either loosen or tighten fastener 12, in this case an allen screw, by engaging recess 24 in the head 20 of the fastener 12.

The lifting eyebolt assembly 9 can be assembled by first inserting fastener 12. into collar 13. If the fastener is a screw, the fastener 12 is threaded into the workpiece until the collar 13 is held tightly against the workpiece. The base portion 18 of the load-bearing ring 10 can be threaded upon the collar 13 until tight and then loosened approximately ½ turn to avoid stressing the fastener threads. When the eye portion 17 of the load-bearing ring 10 is connected to the lifting device, the plane defined by the eye portion 17 will automatically align itself with the direction of pull. Thus, the full strength of the eyebolt is utilized in a way that reduces potentially harmful shear and bending stresses. In another manner of assembly, the components of the lifting eyebolt assembly 9 are pre-assembled but not yet attached to a workpiece. The lifting ring base portion 18 can be threaded onto the collar 13 with the fastener 12 trapped within cavity 21. The base portion can be threaded onto the collar until the bottom surfaces of the base portion and the collar are generally flush. A fastener tool, in this case an allen wrench (not shown), can be inserted through access hole 23 to engage the recess 24 of head 20 of fastener 12. The entire unit is then rotated and threaded into the workpiece.

In one specific manner of assembly, the unit is threaded into the workpiece until hand-tight. The eye portion 17 of the load-bearing ring can then be rotated about the fastener axis 16 to align the plane of the eye portion 17 with the direction of pull of the lifting device. Finally, the allen wrench can be reinserted into access hole 23 in order to securely tighten the fastener 12 to the workpiece. This arrangement allows the vertical plane defined by eye portion 17 to be placed in any desired orientation about axis 16 before finally being tightened into a fixed position with respect to the workpiece. Thus, the load-bearing ring 10 can always be oriented properly with respect to the line of pull from a lifting device so as to fully utilize the strength of the eyebolt.

FIG. 1 shows a variation of the embodiment disclosed in FIG. 1 in which a collar 13′ is modified from the collar 13 in FIG. 1 to include a flange 13a′. The load-bearing ring 10 and fastener 12 are configured substantially as previously described. The base portion 18 of the ring 10 rests on the top surface of the flange 13a′, while the bottom surface of the flange abuts the face of the workpiece 11. The flange 13a′bears most of the forces exerted on the assembly 9′, rather than the fastener 12. The flange 13a′ includes a bore 13b′ therethrough. The base portion 18 can includes a threaded bore 18b aligned with bore 13b′. A set screw 25 can be inserted through bore 13b′ and threaded into bore 18b before the complete lifting eyebolt assembly 9′ is attached to a workpiece.

It is understood that there are numerous other equivalent ways to prevent the load-bearing ring 10 from rotating with respect to collar 13′. For instance, the screw 25 may be replaced by a dowel pin or similar means to fix the ring 10 against rotation relative to the collar 13′ so that the assembly 9′ can be more easily secured to a workpiece without concern that the load-bearing ring will loosen from the collar.

Figure 2:
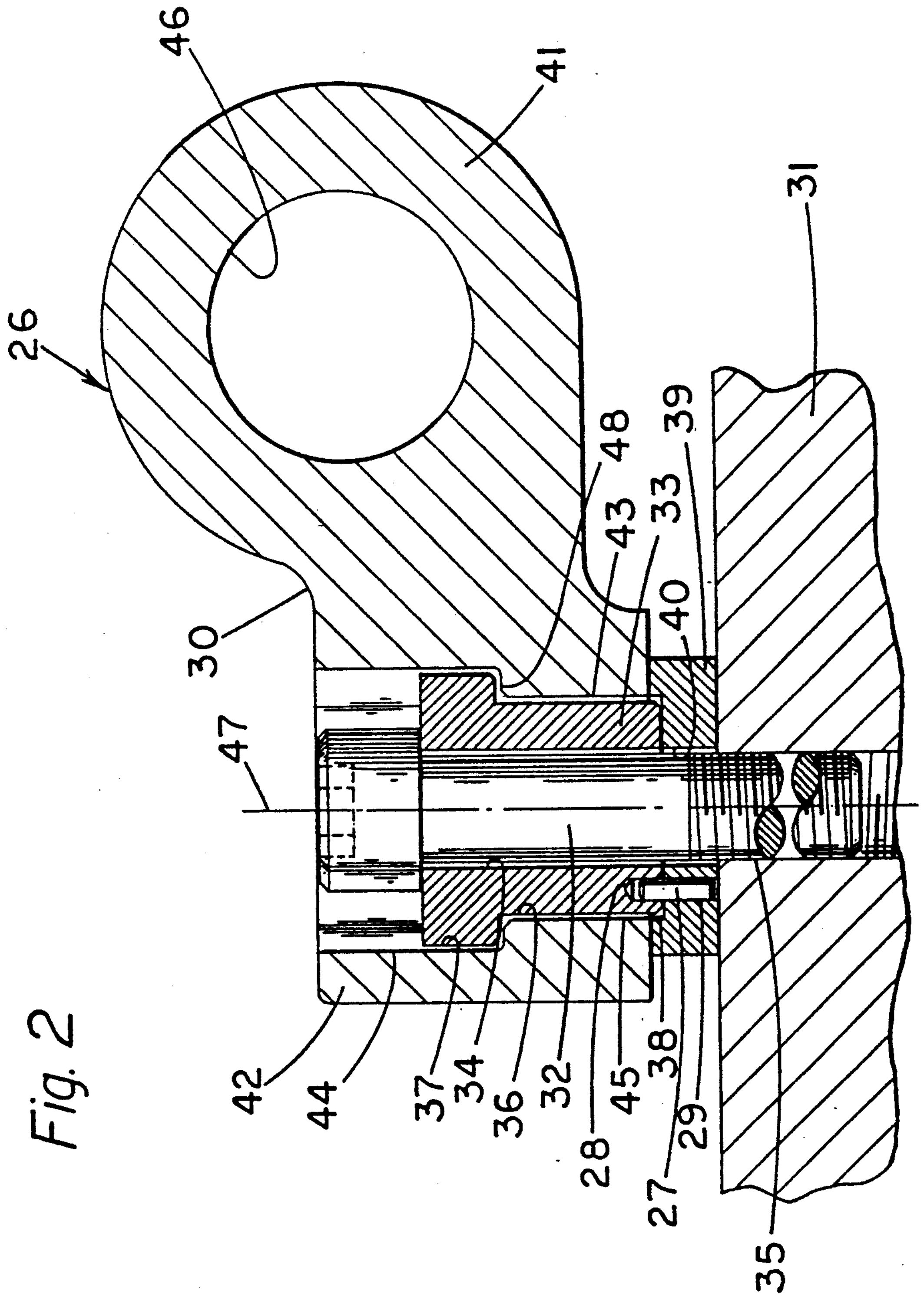
FIG. 2 is a front cross-sectional view of a swiveling offset eye embodiment of the lifting eyebolt assembly of the invention attached to a workpiece.

An eyebolt assembly 26 of another embodiment of the present invention, as illustrated in FIG. 2, incorporates a swiveling offset eye. A load-bearing ring 30 is removably attached to a workpiece 31 by a fastener 32, in the illustrated case an allen screw. A collar 33 defines a longitudinal bore 34 having an inner diameter that allows the shaft 35 of the fastener to pass freely therethrough. The collar 33 includes a cylindrical body 36 with an upper flange 37 of larger outer diameter than the body.

The lower face of body 36 of collar 33 is received within a recess 38 formed in a base plate 39. The base plate 39 defines a hole 40 that has a diameter sufficient to allow the shaft 35 of the screw to pass freely therethrough, similar to the longitudinal bore 34 of the collar. The base plate 39 also includes a bore 29 which is sized to receive pin 27 therethrough. A corresponding bore 28 in the collar 33 can be aligned with bore 29 when the collar is situated within recess 38 of base plate 39. When engaged, the pin 27 prevents the base plate 39 from rotating with respect to collar 33. If desired, the body 36 of the collar 33 could also be made to be threadedly attached or otherwise secured to base plate 39 in order to keep the complete assembly in one piece when not attached to a workpiece.

The load-bearing ring 30 consists of an eye portion 41 and a base portion 42, and is preferably made from forged steel to ensure adequate strength. The base portion 42 includes a bore 43, which is stepped from a first inner diameter 44 down to a second inner diameter 45 creating an internal shoulder 48. The first diameter 44 is made slightly larger than the flange 37 of the collar 33, while the second diameter 45 is slightly larger than the outer diameter of the body 36 of the collar 33. The load-bearing ring 30 is prevented from escaping from the lifting eyebolt assembly 29 because the shoulder 48 is retained under the flange 37 of collar 33.

The complete unit can be assembled by first inserting fastener 32 through the longitudinal bore 34 of collar 33. These two pieces are then received by the base portion 42 of the load-bearing ring 30 so that the flange 37 of collar 33 rests upon shoulder 48. The base plate 39 receives the fastener 32 and the collar 33 at bore 40 and recess 38, respectively. The lifting eyebolt assembly 26 is then secured to the workpiece 31 by tightening the fastener 32 to the workpiece. In this embodiment, the plane defined by the eye 46 automatically aligns with the direction of pull from the lifting device, since the base portion 42 remains free to swivel between flange 37 and base plate 39 about axis 47, after the fastener is fully tightened to the workpiece 31.

Figure 3:
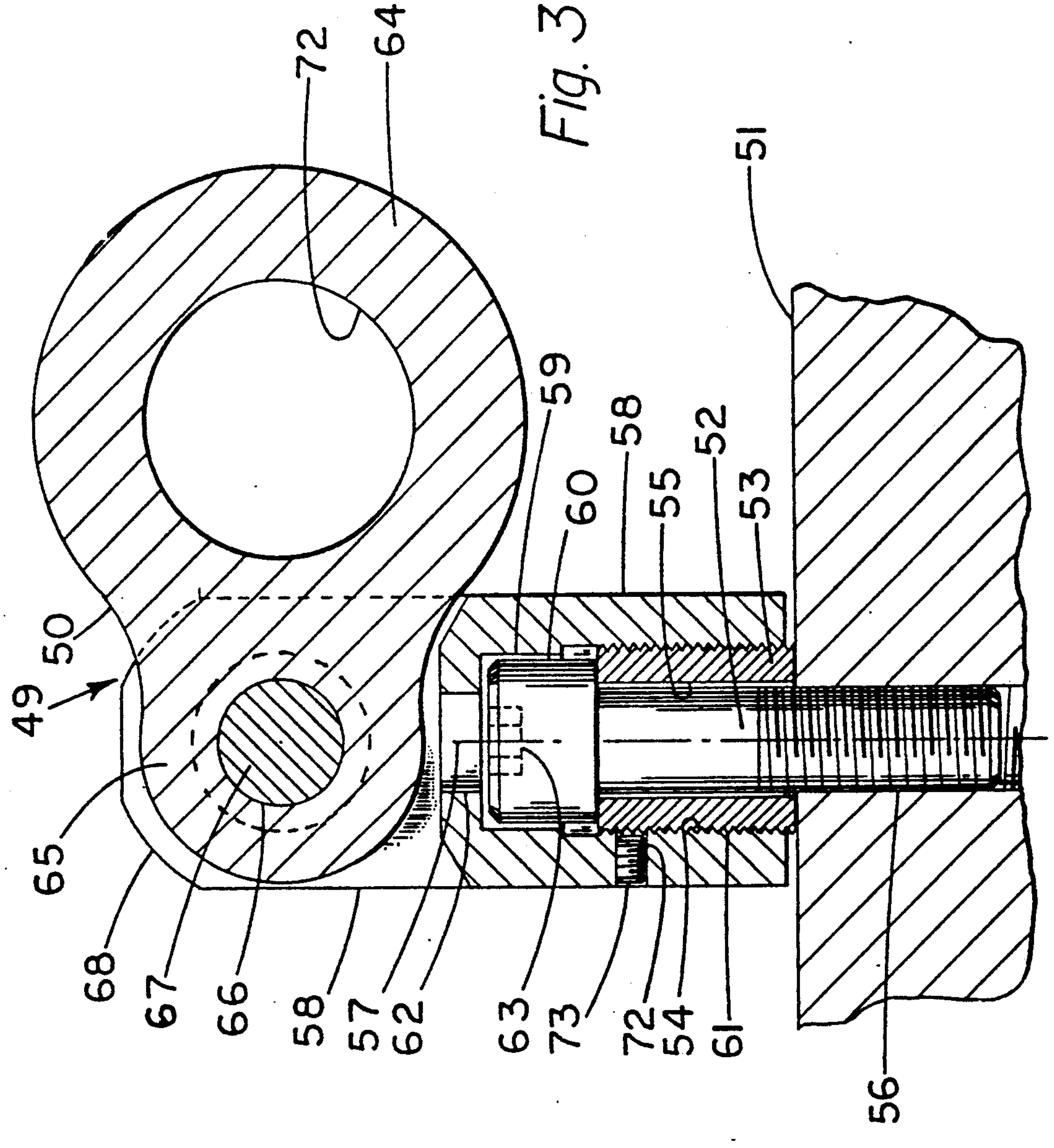
FIG. 3 is a partial front cross-sectional view of a pivoting embodiment of a lifting eyebolt assembly of the invention attached to a workpiece.
Figure 4:
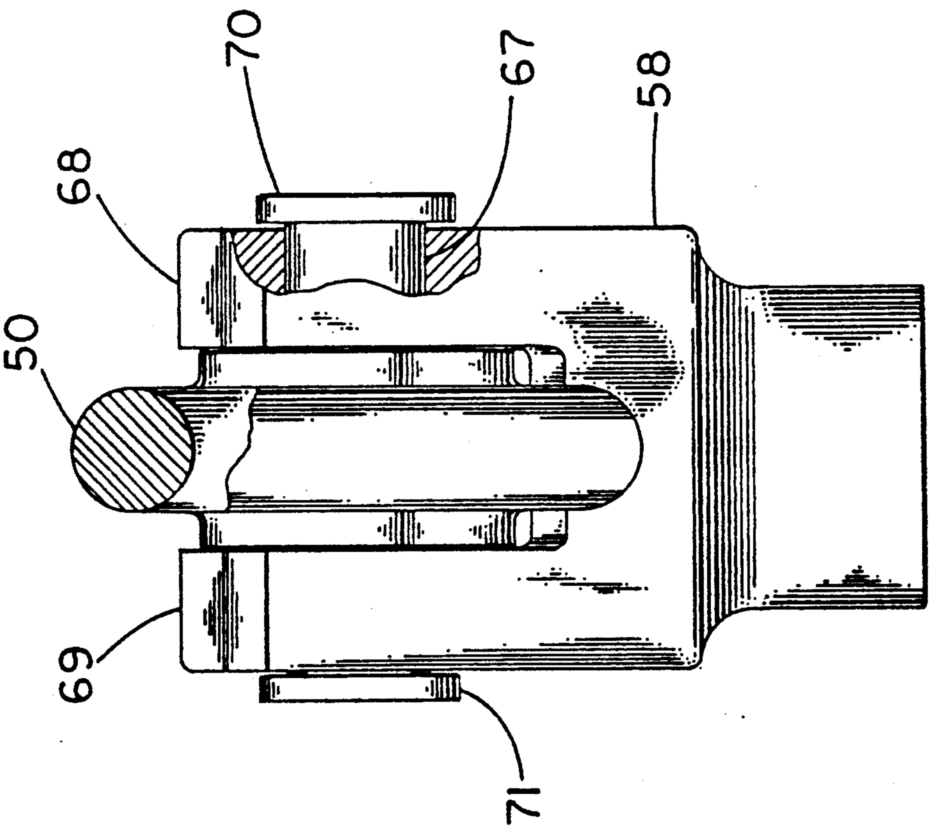
FIG. 4 is a side elevational view of the lifting eyebolt assembly shown in FIG. 3

FIGS. 3 and 4 show another pivoting eye embodiment of this invention. The assembly 49 includes a load-bearing ring 50 removably attached to a workpiece 51 by a fastener 52, in the case an allen head screw. A collar 53 is provided having a threaded outer surface 54 and a longitudinal bore 55 therethrough. The bore 55 size to receive the shaft 56 of fastener 52 therethrough in a way that allows the collar to freely rotate about axis 57 until the collar is tightened to the workpiece 51 by the fastener.

The assembly also includes a housing 58 which defines a cavity 59 large enough to accommodate the head 60 of fastener 52. The cavity 59 is threaded at its inner surface 61 to engage the threaded outer surface 54 of collar 53. The housing 58 also includes an access hole 62 above cavity 59. The access hole 62 provides passage for an allen wrench or other appropriate tool (not shown) to engage recess 63 of the head 60 of the fastener to loosen or tighten fastener 52.

The load-bearing ring 50 includes of an eye portion 64 and a pivot portion 65. The pivot portion 65 includes a bore 66 therethrough that is adapted to be rotatably mounted upon an axle 67. The axle 67 is carried between two upright support arms 68 and 69 that form a part of housing 58, which is best shown in FIG. 4. Axle hubs 70 and 71 are attached at respective ends of the axle 67 in order to keep the axle from escaping the upright support arms 68 and 69.

The housing 58 may also include a threaded bore 72 that opens to cavity 59. After the housing 58 receives the fastener 52 and collar 53 in cavity 59, the housing can be restrained against rotation with respect to collar 53 by tightening a set screw 73 in threaded bore 72 against the outer surface 54 of the collar. A similar set screw may also be used in the embodiment of FIG. 1 to fix the base portion 18 to the collar 13.

Like the embodiment shown in FIG. 1, this embodiment would allow a workman to align the plane defined by the eye 72 with direction of pull from the lifting device before the lifting eyebolt assembly 49 is secured to the workpiece. Furthermore, the pivot feature of this version allows the load-bearing ring 50 to optimally align itself with the direction of pull so as to fully utilize a strength of the eyebolt.

Figure 6:
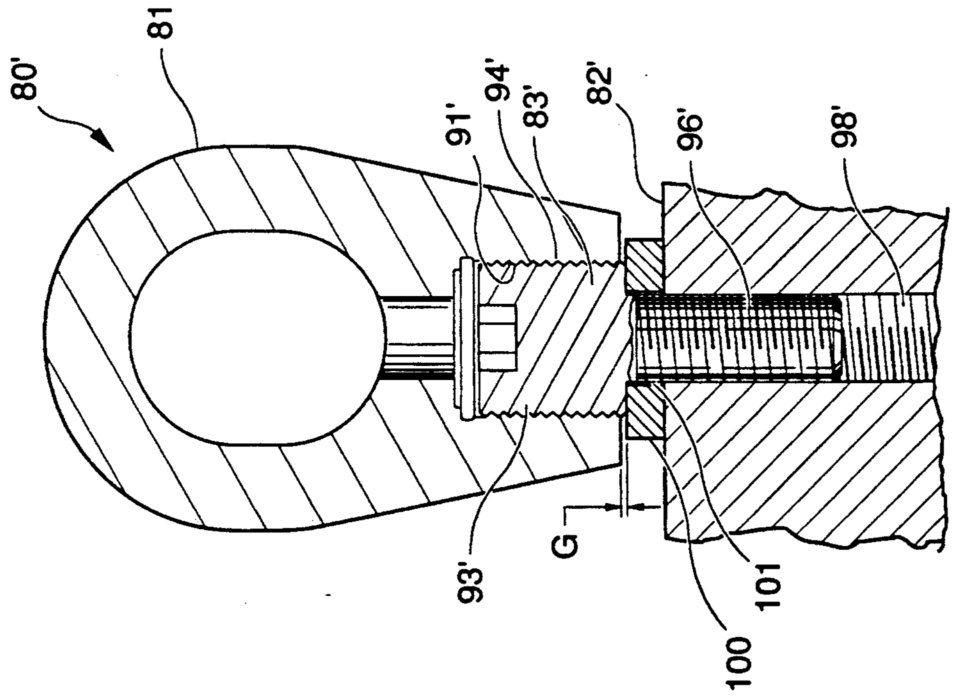
FIG. 6 is a front cross-sectional view of an alternative version of the embodiment of FIG. 5 with the addition of a washer.
Figure 5:
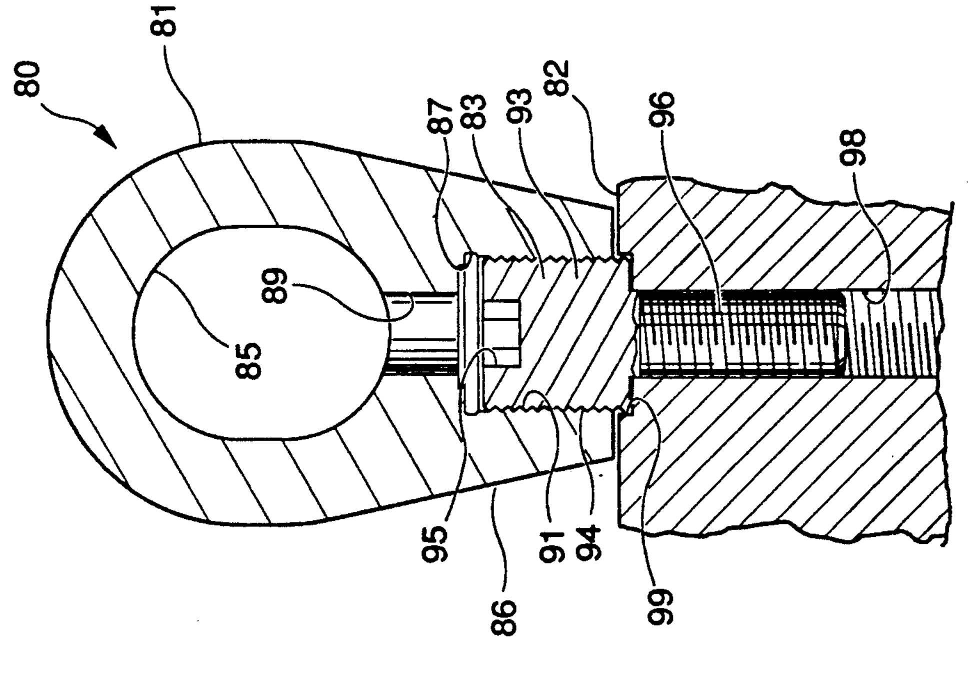
FIG. 5 is a front cross-sectional view of a lifting eyebolt assembly of another embodiment of the invention.

The FIGS. 5 and 6 depict further embodiments of the present invention. In FIG. 5, a lifting eyebolt assembly 80 includes a load-bearing ring 81 which is connected to a workpiece 82 by a fastener 83. Like the prior load-bearing rings, the ring 81 includes an eye portion 85 and a base portion 86. The base portion 86 includes a central cavity 87 opening toward the workpiece. In one aspect of this embodiment, as access hole 89 may be defined in the base portion 86 between the eye portion 85 and the central cavity 87. The load-bearing ring 81 can be similar to the load-bearing ring 10 of the embodiment shown in FIG. 1. As with this previous embodiment, the ring 81 includes internal threads 91 in the central cavity 87.

Unlike the fastener in the previous embodiments, the fastener 83 includes a head portion 93 having a threaded outer surface 94. The threaded outer surface 94 of the fastener 83 is adapted to engage the internal threads 91 of the base portion 86 of the load-bearing ring 81. The fastener 83 also includes a recess 95 disposed at the top surface of the head 93 immediately beneath the access hole 89. As with the prior embodiments, the recess 95 can be configured for engagement with an allen wrench passing through the access hole 89 for the purposes previously discussed.

The fastener 83 also includes threaded shaft portion 96 for engaging an internally threaded bore 98 of the workpiece 82. In the embodiment shown in FIG. 5, the workpiece is machined to form a recess 99 about the threaded bore 98. The diameter of the recess 99 is sufficiently large to permit the head portion 93 of the fastener 83 to fit loosely within.

As with lifting eyebolt assemblies of the previous embodiments, the lifting eyebolt assembly 80 is easily and readily engaged to a workpiece 82. With this embodiment, the threaded shaft portion 96 of the fastener 83 is threaded completely into the threaded bore 98 of the workpiece until the head portion 93 sits within the recess 99 of the workpiece. The load-bearing ring 81 is then threaded onto the threaded head portion 93 of the fastener 83 until the base portion 86 contacts the workpiece 82. At this point, the load-bearing ring 81 is preferably backed off or loosened one quarter to one full turn to avoid stressing the fastener threads. In addition, backing the load-bearing ring 81 off the workpiece can permit the eye portion 85 to be aligned with the direction of pull of a lifting device.

FIG. 6 shows a modification to the embodiment of FIG. 5 in which a lifting eyebolt assembly 80' includes a load-bearing ring 81' which is identical to the load-bearing ring 81 of FIG. 5. A fastener 83', which is identical to the fastener 83 of the prior version, connects the load-bearing ring 81 to a workpiece 82'.The fastener 83' includes a threaded outer surface 94' of the head portion 93' which engages the internal threads 91' of the load-bearing ring 81'.

The workpiece 82' also includes a threaded bore 98' for engaging the mating threads 96' of the fastener 83'. However, unlike the embodiment of FIG. 5, the workpiece 82' does not include a similar recess around the threaded bore 98'. Instead, in this embodiment a washer 100 is included which is situated between the head portion 93' of the fastener 83' and the surface of the workpiece 82'. The washer 100 defines a central opening 101 to receive the fastener 83' therethrough. As with the previous embodiment, the load-bearing ring 81' shown in FIG. 6 is tightened against the washer 100 and then backed off a partial or complete turn. Again, as with the previous embodiment, the lifting eyebolt assembly 80' of the embodiment of FIG. 6 permits the use of a smaller diameter fastener to engage the workpiece and a larger diameter load-bearing ring 81' for engaging the lifting device. Thus, these embodiments of the present invention permit the use of larger load-bearing rings with standard fastener bores in workpieces.

While the invention has been illustrated and described in detail in the drawings and foregoing description, the same is to be considered as illustrative and not restricted in character. For instance, the lifting eyebolt assembly can be made to any size depending on the strength required due the size of the workpiece. It being understood that only the preferred embodiments have been shown and described and that all changes and modifications that come within the spirit of the invention are desired to be protected.

What is claimed is:

1. A lifting eyebolt assembly for connection between a workpiece to be lifted and a lifting device, the assembly comprising:

a fastener having a head portion, a shaft portion and means for fastening said shaft portion to the workpiece;

a load-bearing ring having an eye portion and a base portion, said eye portion having an opening for connection to the lifting devices, said base portion defining a cavity for receiving and containing said head portion of said fastener therein;

means, within said cavity, for engaging said head portion of said fastener to said base portion of said load-bearing ring with said shaft portion of said fastener extending outwardly therefrom; and means for accessing said head portion of said fastener when said fastener is contained within said cavity of said base portion.

2. The lifting eyebolt assembly of claim 1, wherein said head portion of said fastener has a diameter larger than the diameter of said shaft portion.

3. The lifting eyebolt assembly of claim 1, wherein said eye portion and said base portion of said load-bearing ring are integrally formed.

4. The lifting eyebolt assembly of claim 3, wherein said means for accessing includes an access hole through said load-bearing ring extending from said opening of said eye portion to said cavity of said base portion.

5. The lifting eyebolt assembly of claim 4, wherein said head portion of said fastener includes a recess facing said access hole when said head portion is contained within said cavity, said recess being configured for engagement with a tool for rotating said fastener within said load-bearing ring with the tool extended through said access hole.

6. The lifting eyebolt assembly of claim 1, wherein said means for engaging includes means for threaded engagement between said head portion of said fastener and said cavity of said base portion.

7. The lifting eyebolt assembly of claim 1, further comprising:

a washer defining a central opening therethrough, wherein said shaft portion of said fastener extends through said central opening when said fastener is fastened to the workpiece with said washer disposed between said head portion of said fastener and the workpiece.

8. The lifting eyebolt assembly of claim 1, wherein:

said means for fastening includes;

a threaded bore in the workpiece; and said shaft portion being threaded for engaging said threaded bore; and the workpiece includes a recess surrounding said threaded bore, said recess having a diameter larger than the diameter of said head portion of said fastener to receive said head portion therein when said fastener is fastened to the workpiece.

9. The lifting eyebolt assembly of claim 1, wherein said cavity is sized to entirely enclose said head portion of said fastener thereon.

10. A lifting eyebolt assembly for connection between a workpiece to be lifted and a lifting device, the assembly comprising:

a fastener having a head portion, a shaft portion and means for fastening said shaft portion to the workpiece, said head portion having a threaded outer surface; and a load-bearing ring having an eye portion and a base portion, said eye portion having an opening for connection to the lifting device, said base portion defining a cavity for receiving and containing said head portion of said fastener therein, said cavity having an threaded inner surface for engaging said threaded outer surface of said head portion of said fastener.

11. The lifting eyebolt assembly of claim 10, wherein said head portion of said fastener has a diameter larger than the diameter of said shaft portion.

12. The lifting eyebolt assembly of claim 10, further comprising means for accessing said head portion of said fastener when said fastener is contained within said cavity of said base portion.

13. The lifting eyebolt assembly of claim 12, wherein said eye portion and said base portion of said load-bearing ring are integrally formed.

14. The lifting eyebolt assembly of claim 13, wherein said means for accessing includes an access hole through said load-bearing ring extending from said opening of said eye portion to said cavity of said base portion.

15. The lifting eyebolt assembly of claim 14, wherein said head portion of said fastener includes a recess facing said access hole when said head portion is contained within said cavity, said recess being configured for engagement with a tool for rotating said fastener within said load-bearing ring with the tool extended through said access hole.

16. The lifting eyebolt assembly of claim 10, further comprising:

a washer defining a central opening therethrough, wherein said shaft portion of said fastener extends through said central opening when said fastener is fastened to the workpiece with said washer disposed between said head portion of said fastener and the workpiece.

17. The lifting eyebolt assembly of claim 10, wherein:

said means for fastening includes;

a threaded bore in the workpiece; and said shaft portion being threaded for engaging said threaded bore; and the workpiece includes a recess surrounding said threaded bore, said recess having a diameter larger than the diameter of said head portion of said fastener to receive said head portion therein when said fastener is fastened to the workpiece.

* * * * *